United States Patent [19]

Chu et al.

[11] Patent Number: 4,956,241
[45] Date of Patent: Sep. 11, 1990

[54] SLIP COATED THERMOPLASTIC FILMS

[75] Inventors: Shaw-Chang Chu, West Winsor, N.J.; Paul D. Heilman, Williamson; Kevin A. Kirk, Macedon, both of N.Y.

[73] Assignee: Mobil Oil Corporation, New York, N.Y.

[21] Appl. No.: 292,138

[22] Filed: Dec. 30, 1988

[51] Int. Cl.$^5$ .............................................. B32B 27/08
[52] U.S. Cl. .................................... 428/516; 428/484; 428/500; 156/244.11
[58] Field of Search ............... 428/500, 487, 484, 910, 428/516; 156/244.11

[56] References Cited

U.S. PATENT DOCUMENTS

| | | | |
|---|---|---|---|
| 3,176,021 | 3/1965 | Volungis et al. | 260/32.6 |
| 4,302,506 | 11/1981 | Heberger | 428/341 |
| 4,419,410 | 12/1983 | Weiner | 428/516 |
| 4,533,509 | 8/1985 | Gust et al. | 264/171 |
| 4,618,527 | 10/1986 | Doyen | 428/213 |
| 4,741,950 | 5/1988 | Liu et al. | 428/516 |

Primary Examiner—Edith Buffalow
Attorney, Agent, or Firm—A. J. McKillop; C. J. Speciale; H. M. Flournoy

[57] ABSTRACT

A slip-coated thermoplastic film is disclosed wherein the slip coating applied is essentially an aqueous wax emulsion. The wax emulsion is preferably applied to a thermoplastic film such as polypropylene between the machine direction and transverse direction stretching process. The resultant slip-coated film has low haze, non-blocking, and consistently low coefficient of friction for good machinability.

14 Claims, No Drawings

SLIP COATED THERMOPLASTIC FILMS

BACKGROUND OF THE INVENTION

This application is related to Ser. No. 312,271 entitled SLIP COATED THERMOPLASTIC FILMS, filed Feb. 21, 1989, and now pending.

The present invention relates to a coated, biaxially oriented film structure having low haze percentage, excellent non-blocking properties, consistently low coefficient of friction (COF) as an unsupported film and as a supported film which is laminated to another film such as glassine.

Polypropylene films are widely used in the packaging industry due to their superior physical properties, such as high tensile modulus and stiffness, excellent optical clarity, and good moisture barrier characteristics, etc. With all its good characteristics, unmodified polypropylene, however, has the disadvantageous properties of a high inherent COF and film-to-film destructive blocking on storage. As claimed by U.S. Pat. No. 3,176,021, COF characteristics of polypropylene and other thermoplastic films can be beneficially modified by the inclusion in the polymer of fatty acid amides. The effectiveness of the amides relies upon their ability to migrate to the surface of the films in order to reduce COF. While amides do improve the COF of the films, the value of the COF is subject to wide variation depending upon the heat history which the film experiences during shipping, storage, and certain converting processes. In addition, the presence of such amides on the film surfaces can adversely affect the film's appearance as manifested by an increase in haze, a decrease in gloss and the presence of streaks. The presence of the amides on the surface can also adversely affect the wettability and adhesion of solvent and water-based inks, coatings, and adhesives.

It is also known to coat polypropylene film with certain fatty acid amides to impart lubricating and antiblocking characteristics as taught in U.S. Pat. No. 4,255,644. However, the application of such coatings by the film manufacturer is not particularly attractive because of the requirement that they be applied as solutions in organic solvents. Health and safety factors dictate against the in-plant utilization of organic solvents in coating processes undertaken during the film manufacture. U.S. Pat. No. 4,302,506 discloses that a polyester film having excellent slip properties and clarity is prepared using a latex coating containing steramideopropyl-dimethyl-β-hydroxyethylammonium nitrate and a crosslinkable acrylic copolymer. Such a coating, however, is not compliant with FDA regulation for food contact applications. Therefore, it is not suitable for food packaging films.

U.S. Pat. Nos. 4,533,509 and 4,618,527 disclose a multi-layer structure comprising a comparatively thick base layer of an optically clear thermoplastic resin and a comparatively thin surface layer containing a finely divided inorganic material in a proportion sufficient to thereby impart antiblock characteristics and decrease film-to-film COF. The resulting film has non-blocking and improved slip characteristics which are stable regarding heat history without any adverse effects on appearance, wetting and adhesion as typically experienced with amide-modified films. However, when laminated to other films, e.g., glassine paper, such structures exhibit significantly higher COF values and do not perform flawlessly on conventional form, fill and seal machines.

U.S. Pat. No. 4,419,410 discloses an oriented multilayer polypropylene film structure having a surface-modifying agent selected from the group consisting of a slip agent, antistatic agent, antifog agent, antiblock agent and mixtures thereof bloomed on the surface of said polypropylene film structure.

It is an object of the present invention to provide a film having a reduced COF and non-blocking characteristics in comparison with the unmodified film.

It is another object of the present invention to provide a film having non-blocking and improved slip characteristics that are stable with regard to the heat history of the film.

It is yet another object of the present invention to provide a film having non-blocking and improved slip characteristics without the adverse efects on appearance, wetting and adhesion typically experienced with amide-modified films.

It is still another of the present invention to provide a film having non-blocking and improved slip characteristics that are maintained upon lamination of the film to other films, such as glassine.

SUMMARY OF THE INVENTION

According to the present invention, there is provided a slip-coated, biaxially oriented film structure comprising:

I. A comparatively thin surface coating on at least one side of the film. Said coating is composed of (a) an aqueous wax emulsion or dispersion such as carnauba wax, paraffin wax, polyethylene wax, microcrystalline wax or their blends, (b) an aqueous polymer emulsion or solution, which has a glass transition temperature between 30° and 100° C., and is used in an amount of 0 to about 50% by weight based on the total weight of the wax, and (c) a minor amount of talc or Syloid a synthetic amorphous silica gel having a composition of 99.7% $SiO_2$, which is 0 to about 1% by weight based on the total weight of the wax.

II. A comparatively thick base layer of a thermoplastic resin, which is selected from a polypropylene homopolymer, a polypropylene coextruded with ethylene-propylene copolymer on the uncoated side, or any other types of polyolefins in single layer or multilayer forms.

III. The aqueous wax emulsion (I) is preferably applied to the thick base layer of a thermoplastic resin (II) between the machine direction orientation and the transverse direction orientation.

In a preferred form of the invention, the described coated film is laminated to or supported by a different film, such as glassine or another plastic film.

DESCRIPTION OF PREFERRED EMBODIMENTS

In general, the present invention can be practiced with any thermoplastic film for example, the polyolefins in general, and specifically, polymers, copolymers, homopolymers and blends of ethylene, propylene, butylene, etc., polyesters, such as, polyethylene terephthalate, vinyl polymers and copolymers and the like. The basic film structures of the present invention find utility when supported or laminated to another film in order to accommodate a particular end use. Thus, polymer films different from the base film or paper films can be laminated to the base structure for particular purposes. Such polymeric films may include any thermoplastic film different from the base film. Examples of paper films include glassine paper, which is a thin dense paper which is highly resistant to the passage of air and oils.

Particularly preferred polymers employed as the base film herein are polypropylenes which are highly isotactic. The preferred polypropylenes are well known in the art and are formed by polymerizing propylene in the presence of stereospecific catalysts systems. They can have a melt index at 230° C. ranging from about 0.1–25. The crystalline melting point is about 160° C. The number average molecular weight ranges from about 25,000 to 100,000. The density ranges from about 0.90–0.91.

The present invention has also as a primary object, the provision of a specific polymer, such as polypropylene with excellent surface characteristics. The overall thickness of the contemplated film structure must be primarily of the polypropylene. The highly isotatic polypropylene portion of the film should amount to from about 70 to about 97% of the overall film structure. The layer may be present on one surface of the base layer of polypropylene. If a single skin layer is on the uncoated surface of the base film the preferred range is from about 1.5 to 30% of the overall thickness. The oerall thickness of the multi-layer film structure is not critical but, preferably, can range from about 0.35 to 2.0 mils.

The slip coating applied is essentially an aqueous wax emulsion such as carnauba, polyethylene wax, paraffin wax, microcrystalline wax or their blends. The wax emulsion is preferably applied to a thermoplastic film such as polypropylene between the machine direction and transverse direction stretching process.

The core or base substrate of the film structure of the present invention may contain additives such as antistatic compounds, additional slip agents, anti-fog agents, anti-block agents and the like. It is usual to include in the resin raw material the additive desired to modify the surface characteristics of the resin in film form. Normally this incorporated in the resin by the resin suppliers.

Depending upon the particular purpose of the film, additives in the base may not be required but may be used if desired. The film of the present invention can be prepared employing commercially available systems for extruding resins. The polyproplene homopolymer can be coextruded with a polypropylene homopolymer or copolymer. The polymers are brought to the molten state and coextruded from a conventional extruder through a flat sheet die, the melt streams being combined in an adapter prior to being extruded from the die. After leaving the die orifice, film structure is chilled and the quenched sheet then reheated and stretched, e.g. five times in the machine direction (MD) and preferably at this point the slip coating is applied and subsequently about e.g., eight times in the transverse direction (TD).

The following examples are exemplary only and are meant in no way to limit the scope of the invention.

EXAMPLE 1

An aqueous wax emulsion containing 9.11% (total solids) by weight of Michem Lube 193 (No. 1 Carnauba Wax) was placed in a gravure coater which had been installed between the MD orienter and the TD orienter of a pilot scale film orienter. Polypropylene resin (Exxon 4252) was extruded through a flat sheet die at 250° C., cast onto a cooling drum and quenched at 30° C. The sheet, measured abot 20 mil thick, was reheated to 140° C. and stretched 5-fold in the MD, then corona treated for improved surface wettability. When passing through the gravure coater, the MD oriented film web, now about 4 mil thick, was coated with the coating dispersion. The coated web was dried in pre-heat zones at 160° C., then stretched 8-fold in the TD at 145° C. and annealed at 160° C. The biaxially stretched film, measured 0.5 mil thick, was corona treated on the uncoated side to improve the wettability and adhesion of ink and adhesives that might be applied later on. The coated film had the following properties, depending on the coating weights.

TABLE 1

|  |  | ASTM No. |
|---|---|---|
| COF | 0.15–0.3 | D1894 |
| Blocking | <5 g/inch |  |
| Haze | ≦2.5% | D-1003 |
| Gloss at 45° | ≧80 | D-2457 |
| Coating Weight | 0.01–0.03 mg/in$^2$ |  |

EXAMPLES 2-6

A series of coating compositions were applied to polypropylene film in the same manner as described in Example 1. In these compositions, the weight percentage of the wax of Michem 193 (total solids 9.1%), an acrylic resin (MMA/MA/MAA=51.5/44.5/4.0, supplied by Valspar Corporation) and talc were varied to demonstrate the range of the coating composition.

TABLE 2

| | COATING COMPOSITION | |
|---|---|---|
| Example | (1)<br>Wax/Acrylic/Talc | (2)<br>COF |
| 2 | 100/10/— | 0.19 |
| 3 | 100/20/— | 0.21 |
| 4 | 100/—/1 | 0.20 |
| 5 | 100/10/1 | 0.21 |
| 6 | 100/20/1 | 0.19 |

(1) Weight ratio on a dry basis
(2) Measured from coated films of similar coating weights/0.02 mg/in$^2$).

To determine the film machinability, the slip coated films obtained from Examples 1, 3–6 and an additional control (EXAMPLE 7) were extrusion laminated by means of a low density polyethylene adhesive to a 1.6 mil thick glassine paper and tested on Mira-Pak Miramatic Model L vertical form, fill and seal packaging machine and results are given in Table 3.

TABLE 3

| Example | COF | FOFC (lbs) |
|---|---|---|
| 1 | 0.28 | 23 |
| 3 | 0.26 | 24 |
| 4 | 0.33 | 30 |
| 5 | 0.20 | 25 |
| 6 | 0.27 | 26 |
| 7 | 0.21 | 34 |

Example 7 was a commercial slip film based on U.S. Pat. No. 4,618,527. For practical commercial packaging applications, the force over the forming collar (FOFC) should not exceed 30 lbs. for a supported film. Otherwise, the film will risk machine downtime because of machine jamming and high squeal noise. Examples 1, 3–6 made in accordance with the present invention all has FOFC values no greater than 30 lbs. and therefore they can be used satisfactorily on the packaging machinery with high reliability.

This invention as shown in the above data discloses a slip coating composition that can preferentially be applied to polypropylene film between the MD and TD orientation. The slip coated film has advantages over the fatty acid amide-modified films and particulates containing coextruded films in the low COF consistency and good machinability.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed:

1. An oriented slip-coated film structure comprising a polyproplyene film comprising (1) a relatively thin surface coating on at least one side of said film composed of a slip coating consisting of (a) an aqueous wax emulsion or dispersion (b) an aqueous polymer emulsion or solution having a glass transition temperature between about 30°–100° C. and which comprises from about 0 to 50 weight percent based on the total weight of said wax emulsion and (c) a minor amount comprising from about 0 to about 1 weight percent based on the total weight of said wax of talc or synthetic amorphous silica gel, (2) a relatively thick base layer of a thermoplastic resin selected from polypropylene homopolymer, polypropylene coextruded with ethylene-propylene copolymer on the uncoated side or other suitable polyolefin in single or multi-layer forms wherein the base layer thereof has a melt index at 230° C. ranging from about 0.1 to 25, a crystalline melting point of about 160° C., a density ranging from about 0.90 to 0.91 and a number average Mw ranging from about 25,000 to 100,000.

2. The structure of claim 1 wherein said base layer is biaxially oriented.

3. The structure of claim 2 wherein said slip-coating is applied between the machine direction orientation and the transverse direction orientation.

4. The structure of claim 3 wherein the coated film is laminated to or supported by a different film.

5. The structure of claim 4 wherein said different film is glassine.

6. The structure of claim 1 wherein the aqueous wax emulsion is selected from carbauba wax, paraffin wax, polyethylene wax, microcrystalline wax or blends thereof.

7. The structure of claim 1 wherein the base layer is a polypropylene homopolymer and is highly isotactic.

8. The structure of claim 1 wherein a thin thermoplastic film layer is applied or laminated to the side not containing the slip coating.

9. The structure of claim 8 wherein said thermoplastic layer is different from the base layer.

10. The structure of claim 9 wherein said thermoplastic layer is glassine.

11. The structure of claim 10 wherein said glassine is laminated to said structure by means of an adhesive.

12. A method of making an oriented slip-coated film structure comprising applying to at least one surface of a relatively thick thermoplastic film selected from polypropylene homopolymer, polyproplene coextruded with ethylene-propylene copolymer on the uncoated side or other suitable polyolefin in single or multi-layer forms, a slip-coating composition consisting of (a) a relatively thin coating comprising a blend of an aqueous wax emulsion or dispersion (b) an aqueous polymer emulsion or solution having a glass transition temperature between about 30°–100° C. and which comprises from about 0 to 50 weight percent based on the total weight of said wax emulsion and (c) a minor amount comprising from about 0 to about 1 weight percent based on the total weight of said wax of talc or synthetic amorphous silica gel, and wherein the base layer of said film structure has a melt index at 230° C. ranging from about 0.1 to 25, a crystalline melting point of about 160° C., a density ranging from about 0.90 to 0.91 and a number average Mw ranging from about 25,000 to 100,000.

13. The method of claim 12 wherein the structure is biaxially oriented.

14. The method of claim 12 wherein the slip-coating layer is applied to the thermoplastic film between the machine direction and transverse direction stretching process.

* * * * *